May 30, 1972 E. J. SZETELA 3,666,634

VARIABLE DEPTH ETCHING PROCESS

Filed March 30, 1970

INVENTOR
EUGENE J. SZETELA
BY Donald J. Bradley
ATTORNEY

United States Patent Office 3,666,634

Patented May 30, 1972

3,666,634

VARIABLE DEPTH ETCHING PROCESS

Eugene J. Szetela, South Windsor, Conn., assignor to United Aircraft Corporation, East Hartford, Conn.

Filed Mar. 30, 1970, Ser. No. 23,664
Int. Cl. C23b *5/48;* B23p *1/00*
U.S. Cl. 204—15 4 Claims

ABSTRACT OF THE DISCLOSURE

Variable depth etched channels are formed in a metal substrate. A pattern is formed on the substrate by standard photo-etching techniques, and a film of gold is deposited on the portions of the metal substrate which are not to be formed into channels. In one embodiment a metal overlay such as nickel is electrodeposited over the entire assembly at a variable depth. The metal overlay is then chemically etched until the overlay is completely removed. Maximum depth of the etched channels will be related to the maximum thickness of the overlay. In another embodiment, the substrate with the gold film is put through a deplating process which will form the channels by electroremoval of substrate material.

BACKGROUND OF THE INVENTION

Field of the invention

This invention relates to a process for producing channels of variable depth in a metallic substrate. More specifically, standard photoetching and electrodeposition techniques are combined to produce channels of variable depth in any metallic material. The width and shape of the passages may also be varied by this process.

Description of the prior art

In many applications there is a need for a simple, accurate and inexpensive method for fabricating variable depth channels in a material such as metal. Standard machining tetchniques are time consuming and expensive, particularly where close tolerances are required.

The present invention discloses a simple and inexpensive method for producing such channels. The techniques involved are standard photoetching and electrodeposition or electroremoval techniques, and may be practiced by anyone having reasonable skills in these arts.

Variable depth channels are quite useful in many applications and may serve as cooling passages in turbine vanes, rocket walls or supersonic inlets. For example, there is disclosed in copending application Ser. No. 840,954, now Pat. No. 3,572,031, entitled "Variable Area Cooling Passages for Gas Turbine Burners" filed July 11, 1969 by Eugene J. Szetela, a cooling system for maintaining the walls of a gas turbine burner within acceptable temperature limits.

In the copending application, variable cross-sectional area cooling passages are provided in the walls of a gas turbine burner can, a coolant fluid being varied in velocity as it proceeds through the passages by virtue of a change in the cross-sectional area of the passages. The variation in velocity produces a variable rate of cooling. The variation in cross-sectional area may take the form of a variable depth passage or a variable width passage, or both. The passages may be formed by bonding two substrates having variable depth channels. The present invention discloses a novel method for forming variable depth channels. The width of the channels may also be varied in carrying out this invention.

SUMMARY OF THE INVENTION

A primary object of this invention is to provide a process for producing channels of variable depth in a metallic substrate.

In accordance with a preferred embodiment of the present invention, a photographic negative is prepared containing the pattern of the desired channels. The metal substrate in which the variable depth channels are to be formed is coated with the desired photoresist chemical. The negative is positioned on the metal and exposed to ultraviolet light in the standard fashion of photoetching. The exposed portions of the assembly are stripped in a standard manner leaving the desired pattern on the substrate. A thin layer of gold or other metal resistant to the final etching bath is then electrodeposited on the bare metal substrate. The remainder of the photoresist chemical which formed the desired pattern on the substrate is then stripped, leaving the substrate with a pattern of gold metal and areas of the present substrate metal. Next another metal such as nickel is electrodeposited over the entire assembly in a varying depth pattern in accordance with the desired pattern of depth variation of the channels. Standard techniques such as variable electrode spacing or variable current density, or a combination of the two, may be used to electrodeposit the nickel to the variable depth. Then the entire assembly is chemically etched.

In another embodiment of this invention, similar methods may be used to produce a variable depth underlay by removing material by variable depth deplating between masked channels.

DESCRIPTION OF THE PREFERRED EMBODIMENT

Figure 1:
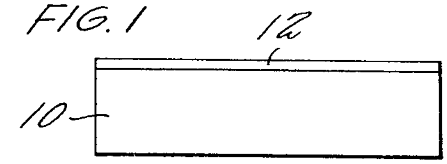
FIGS. 1–5 are side elevations showing the application to a substrate of various steps in the process.

A preferred embodiment of this invention involving standard photoetching techniques will be described. The process of the preferred embodiment utilizes photoetching techniques initially, diverges slightly from these techniques when a variable thickness coating is electrodeposited, and then turns back to standard photoetching techniques.

In referring to the figures, it is to be understood that the drawings are highly schematic, and that the respective thicknesses of the films and layers or deposits shown therein are not necessarily to scale.

According to the invention, there is provided a metallic substrate of steel, nickel, or other metal or alloy in which it is desired to provide variable depth channels. The substrate is shown as reference numeral 10 throughout the drawings.

As is known in the photoetching art, a standard commercially available photoresist layer 12 is coated on substrate 10 as shown in FIG. 1. A pattern such as a negative of the plan of the final configuration is prepared and positioned on top of the substrate 10. The pattern is shown in FIG. 2A, and contains two narrow linear dark areas 14 which correspond to the desired channels. The entire assembly is then exposed to ultraviolet light by which the characteristics of the photoresist film 12 exposed to the light are changed as is well known in the photoetching art.

Figure 2:
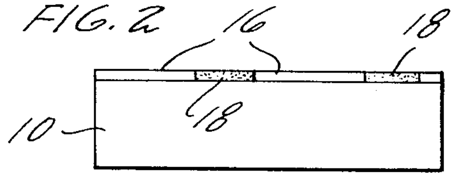
Figure 2A:
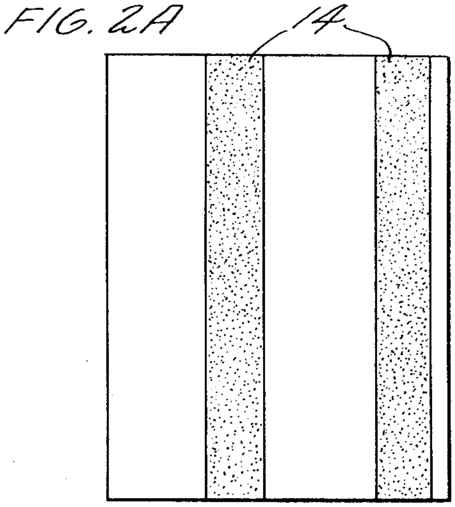
FIG. 2A is a plan view of the negative of the desired pattern.

FIG. 2 shows the substrate 10 and the photoresist layer in which portions 16 have been chemically changed by exposure to ultraviolet light through the negative shown in FIG. 2A. Portions 18 of the photoresist area are left unchanged as a result of the darkened areas in pattern 14 which shield the coated substrate from exposure to the ultraviolet light. Typically, the photoresist 12 is a monomer which is converted to a polymer by ultraviolet light. Sections 16 of FIG. 2 would then be polymers, whereas sections 18 would remain monomers.

Figure 3:
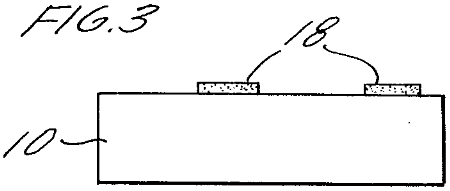

The next step of the process is removal of the polymers 16 of FIG. 2 by stripping them with any commercially available solvent useful for this purpose. Only the monomers 18 in the pattern remain on the substrate 10 is shown in FIG. 3.

Figure 4:
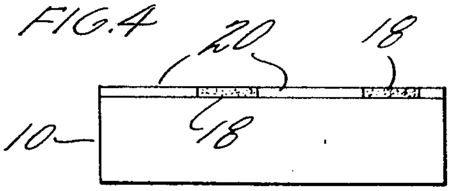

A very thin film or layer of gold 20 is then electrodeposited on the substrate surface as shown at FIG. 4. The gold is deposited on the bare metal, but not on the monomer portion 18. Any standard electroplating technique may be used. Other metals may be used instead of gold as long as the metal chosen is resistant to the final etching bath.

Figure 5:
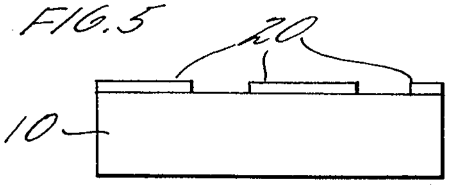

After the film 20 of gold is deposited, the monomer layers 18 are stripped from the substrate with any commercially available solvent available for this purpose as shown at FIG. 5. Again standard photoetching techniques may be used. The assembly now comprises the metallic substrate 10 with strips of inert gold 20 deposited thereon, the strips of gold being separated by a space having a width equal to the width of the desired variable depth channels.

The next step of the process is the electrodeposition over the entire assembly of a new metal such as nickel, the nickel being deposited at a variable depth over the substrate, the depth of the nickel at any point above the portions of the substrate where it is desired to form the channels being determined by the desired depth of the channel.

The following simplified equation shows the desired depth of nickel at any point for a case where the substrate has the same etching rate as nickel:

Depth of nickel at any point=Maximum depth of nickel—Desired channel depth at that point When the substrate etching rate is different from nickel, the equation is modified accordingly.

Figure 6B:
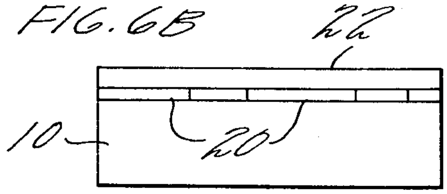
FIGS. 6, 6A and 6B are respectively the side elevation, front elevation and rear elevation of a step in this process.
Figure 6:
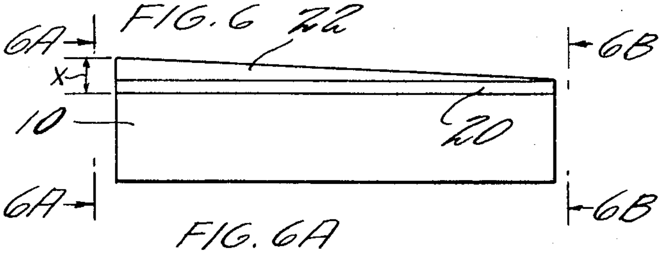
Figure 6A:
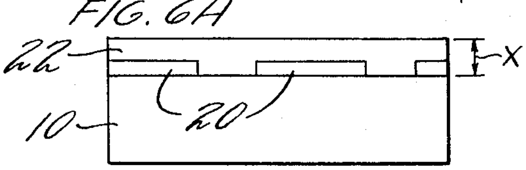

As seen in the example shown in FIG. 6 the nickel 22 is deposited to a much greater depth on the left hand side of the assembly than it is on the right hand side, and depth of the nickel is graduated. FIGS. 6A and 6B show respectively the front and rear elevation of the assembly of FIG. 6.

Any standard technique may be used to produce the variable depth nickel deposit. Typical techniques, well known in the art, utilize variable electrode spacing or variable current densities in the electrodeposition process. A combination of the two methods may also be used. For a description of a variable current density technique, reference may be had to "Electroplating Engineering Handbook," Reinhold Publishing Co., New York, 1962, at page 480.

While nickel is a preferred metallic deposit because of its ease of etching, any metal may be chosen for the variable depth layer 22 as long as it is easily etchable and is able to be electrodeposited.

The entire assembly is then etched with any standard etching chemical to remove the entire layer of deposited nickel 22. The greatest depth of the deposited nickel 22 is shown in FIG. 6 as height X. If the entire layer of nickel is removed, the right hand side of the assembly will have the very thin layer of nickel 22 removed, and in addition the susbtrate 10 will be removed to a depth equal to the height X when the substrate has the same etching rate as nickel. When the substrate etching rate is different from nickel, the relation between the removed depth and deposited depth is modified accordingly. The gold portions of the assembly will not be affected by the etch. Thus, when the entire depth of nickel is removed, the depth of the channel at any point is equal to the maximum depth of the nickel (X) less the depth of nickel at that point.

Figure 7B:
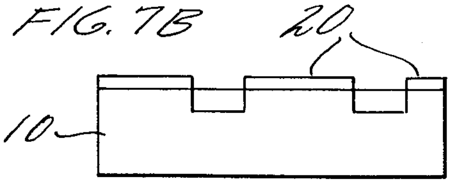
FIGS. 7, 7A and 7B are respectively the side elevation, front elevation and rear elevation of the finished product showing variable depth channels.
Figure 7:
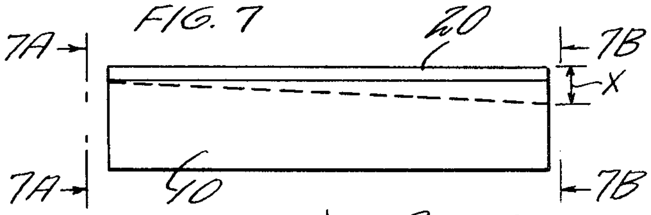
Figure 7A:
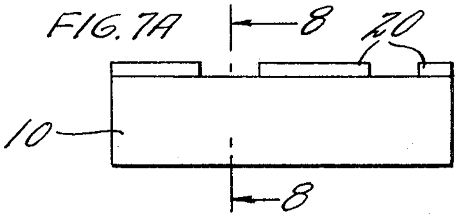

FIGS. 7, 7A and 7B show the finished assembly after the assembly has been etched for a time sufficient to remove the entire depth of nickel. A channel has been formed in the substrate which varies in depth from the left hand side of the substrate to the right hand side. In FIG. 7A the front elevation of FIG. 7 is shown, the channel being equal to the height of the gold deposit 20. The FIG. 7B, which shows the rear elevation of FIG. 7, the substrate material 10 has been removed to a considerably greater depth.

Figure 8:
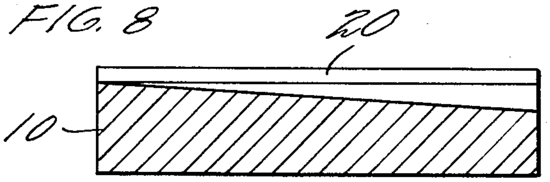
FIG. 8 is a cross-sectional view of section 8—8 of FIG. 7A.

FIG. 8 shows a cross section taken across section 8—8 of FIG. 7A, and clearly shows the channel formed by this process.

It will be apparent to one skilled in the art that the channels need not be graduated as shown in the figures but may take any shape. Likewise, the width of the channels need not be constant but may also vary. Any variable cross section channel may be easily produced by this method.

It will also be apparent to one skilled in the art that in some cases, the final two steps can be combined into one. Instead of using the nickel overlay and final etch, the substrate with the gold strips can be put through a deplating process which can form the channels by electroremoval of substrate material. Using variable spaced electrodes or variable current densities or a combination of both the channel depth can be controlled locally to produce the desired depth variations.

This shortened process can be considered as a special case of the main process described herein. Its use is limited to a combination of conditions where the substrate material is of a composition which is easily deplatable, the final channels are shallow, and the depth variation is gradual.

The gold masking agent can be allowed to remain on the substrate, and its use in the process described herein offers further advantages. After the variable depth channels are produced in the substrate, the end item is usually bonded to a cover and the channels thus become passages with variable cross-sectional area. The gold can be used, in some cases alone, and in other cases with an alloying agent, to produce the bond. Since the gold is chemically stable, the bond becomes impervious to attack if it is desired to utilize the final passages where they will be in contact with harmful, chemically active chemicals.

While this invention has been described in its preferred embodiment, it will be readily apparent to those skilled in the art that certain modifications may be made to the process without departing from the scope of the invention.

I claim:

1. A process for producing variable depth channels in a substrate comprising the steps of
   - coating the substrate with a photoresist layer,
   - exposing the layer to an image of the desired channel pattern,
   - removing that portion of the photoresist layer which does not correspond to the desired channel pattern,
   - electrodepositing a layer of substantially inert metal on the substrate portion from which the photoresist layer was removed,
   - removing the portion of the photoresist layer corresponding to the channel pattern,
   - electrodepositing a layer of etchable metal on the substrate to a depth at each point of the channel pattern corresponding to the desired channel depth at that point, the depth of said etchable metal layer being independent of the width of the channel,
   - and etching said etchable metal and the substrate portion thereunder until the entire deposit of said etchable metal is removed.

2. A process as in claim 1 in which said substantially inert metal is gold.

3. A process as in claim 1 in which said etchable metal is nickel.

4. A process as in claim 1 in which the process by which said etchable metal is electrodeposited to a variable depth is that of variable current density.

References Cited

UNITED STATES PATENTS

| | | | |
|---|---|---|---|
| 2,833,702 | 5/1958 | Elfers | 204—143 |
| 3,095,364 | 6/1963 | Faust et al. | 204—143 |
| 3,179,543 | 4/1965 | Marcelis | 204—143 |
| 3,208,923 | 9/1965 | Feiner et al. | 204—143 |
| 1,750,418 | 3/1930 | McFarland | 204—143 |
| 3,236,708 | 2/1966 | Tillis | 204—143 |

JOHN H. MACK, Primary Examiner

T. TUFARIELLO, Assistant Examiner

U.S. Cl. X.R.

156—7, 8; 204—143 R